(12) United States Patent
Lindacher et al.

(10) Patent No.: US 7,434,930 B2
(45) Date of Patent: Oct. 14, 2008

(54) CONTACT LENS DESIGN FOR LARGE AMPLITUDE TRANSLATION

(75) Inventors: Joseph Michael Lindacher, Suwanee, GA (US); Corneliu Daniel Niculas, Suwanee, GA (US)

(73) Assignee: Novartis AG, Basel (CH)

( * ) Notice: Subject to any disclaimer, the term of this patent is extended or adjusted under 35 U.S.C. 154(b) by 253 days.

(21) Appl. No.: 11/312,049

(22) Filed: Dec. 20, 2005

(65) Prior Publication Data

US 2006/0170861 A1 Aug. 3, 2006

Related U.S. Application Data

(60) Provisional application No. 60/638,648, filed on Dec. 22, 2004.

(51) Int. Cl.
*G02C 7/04* (2006.01)

(52) U.S. Cl. ............... 351/161; 351/160 R; 351/160 H; 351/177

(58) Field of Classification Search ................. 351/161, 351/177, 160 R, 160 H
See application file for complete search history.

(56) References Cited

U.S. PATENT DOCUMENTS

| 4,618,229 A | 10/1986 | Jacobstein et al. ........... 351/161 |
| 6,773,107 B2 * | 8/2004 | Ye et al. ...................... 351/161 |
| 2002/0021410 A1 | 2/2002 | Ye et al. ...................... 351/161 |
| 2003/0095231 A1 | 5/2003 | Ezekiel ........................ 351/161 |
| 2004/0017542 A1 | 1/2004 | Lindacher et al. ........... 351/160 |
| 2004/0218141 A1 | 11/2004 | Ye et al. ...................... 351/160 |

FOREIGN PATENT DOCUMENTS

| EP | 0 651 276 | 5/1995 |
| FR | 2 582 416 | 11/1986 |
| WO | WO 99/23527 | 5/1999 |
| WO | WO 02/14929 | 2/2002 |
| WO | WO 2004/011989 | 2/2004 |

* cited by examiner

*Primary Examiner*—Scott J Sugarman
(74) *Attorney, Agent, or Firm*—Robert J. Gorman, Jr.

(57) ABSTRACT

The present invention is directed to a contact lens design where the optics position relative to the pupil is controlled by the lens relationship to the lower lid.

23 Claims, 2 Drawing Sheets

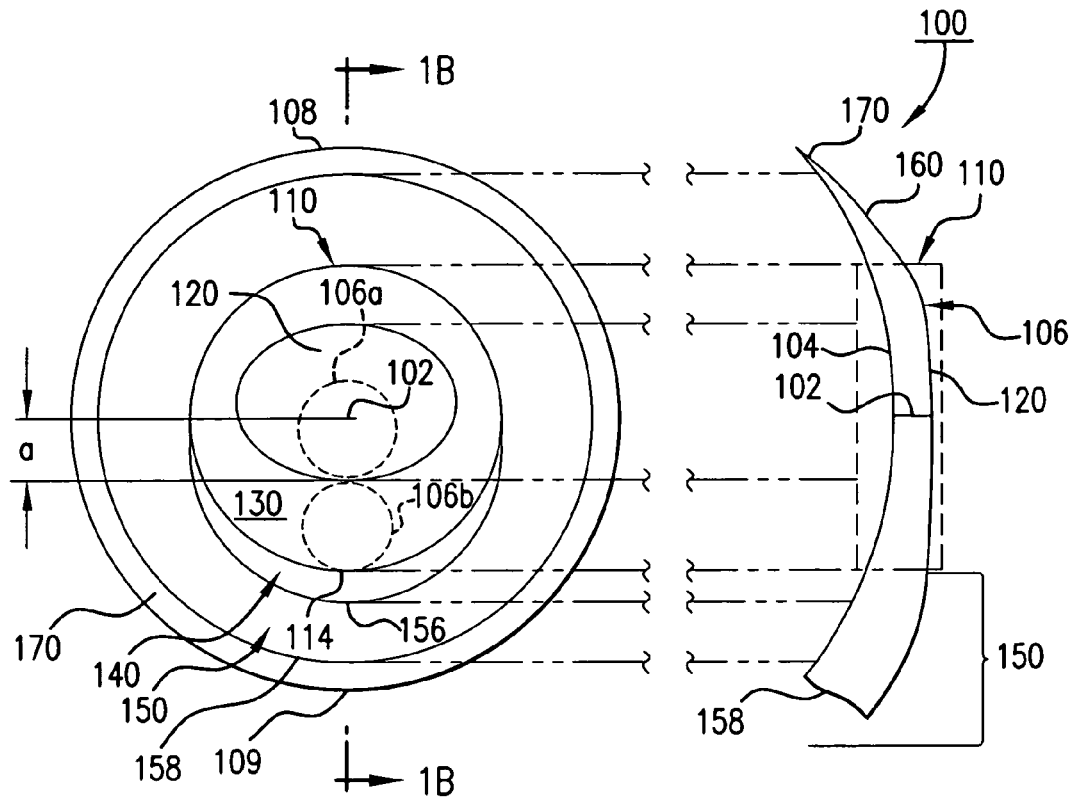
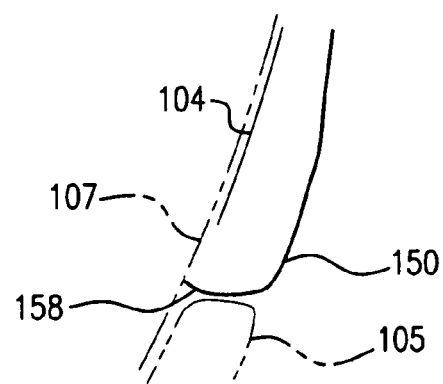
FIG. 1A   FIG. 1B
FIG. 1C

CONTACT LENS DESIGN FOR LARGE AMPLITUDE TRANSLATION

FIELD OF THE INVENTION

This application claims the benefit under 35 USC § 119 (e) of U.S. provisional application No. 60/638,648 filed Dec. 22, 2004, incorporated by reference in it's entirety.

The present invention is directed to a contact lens design where the optics position relative to the pupil is controlled by the lens relationship to the lower lid. More specifically, the present invention provides a lens design that allows large amplitude translation on the eye through use of an undercut ledge.

BACKGROUND OF THE INVENTION

Contact lenses are widely used for many different types of vision deficiencies. These include defects such as near-sightedness and far-sightedness (myopia and hypermetropia, respectively), and defects in near range vision usually associated with aging (presbyopia). Current opinion holds that presbyopia occurs as a person ages when the lens of eye begins to crystallize and lose its elasticity, eventually resulting in the eye losing the ability to focus on nearby objects.

Some presbyopic persons have both near vision and far vision defects, requiring bifocal lenses to properly correct their vision. Many people prefer wearing contact lenses to correct their vision rather than bifocal eye glasses.

A typical single vision contact lens has a focus, which is the point on which parallel rays of light focus when the lens is placed perpendicular to the parallel rays, and an optical axis, which is an imaginary line drawn from the focus to the center of the lens. A posterior surface fits against the cornea and an opposite anterior surface has a vision surface that focuses light to correct the eye's vision. In the case of a typical spherical lens, the vision surface has a single radius of curvature that is the distance from any point on the vision surface to a point on the optical axis referred to as the center of curvature. A bifocal lens has at least two vision surfaces on the anterior surface of the lens: a distance vision surface, for gazing at far off objects, and a near vision surface, for gazing at close objects (e.g., while reading).

Effective use of a bifocal contact lens requires translation of the eye between vision surfaces when the eye changes from gazing at an object at a distance to gazing at a nearby object. In such a situation, the pupil must move from being subtended by the distance vision surface to being subtended by the near vision surface.

In designing a lens, translation is of particular importance. Most lenses have difficulty translating across the surface of the eye when the visual direction of the eye changes from horizontal gaze distance vision to down gaze near vision. This is due to the ability of a soft contact lens to conform closely to the shape of the cornea. For this reason, soft translating bifocal contact lenses are uncommon. Thus, users who desire bifocal contact lenses are usually limited to using the more uncomfortable hard lenses, while those who wish to wear soft contact lenses are usually limited to wearing mono-focal lenses.

Therefore, there is a need for a soft bifocal contact lens that supports translation across the surface of the eye when the eye changes position from distance vision to near vision. Lenses with a translation "ridge" on the front surface have been produced; however, if the ridge feature does not have an undercut, the lid may not engage the lens and hence, the lens translation amplitude may be insufficient, resulting in poor bifocal performance.

If the ridge is located close to the edge, on a steeper position of the lens, the lid tends to roll over the ridge feature and the lens does not translate. If the ridge is positioned nearer to the center of the lid, where the lid can engage the ridge, the lower lid may not provide enough movement for effective amplitude of the lens translation.

An undercut features currently require slides in the mold bases during the injection molding process, which prevents use of high volume mold manufacture.

SUMMARY OF THE INVENTION

The present invention includes a method for manufacturing a translating lens as well as a design for translating lens. The contact lens of the present invention preferably has a top, a bottom, a rotational axis, a front surface and a base surface. The front surface includes a plurality of zones, one of which is an optical zone having a lower edge with a distance vision zone having a curvature range that provides distance vision correction and having a first area that is sufficient to overlay a substantial portion of a pupil of a user and disposed in a first position within the optical zone so that the user's pupil is substantially subtended by the distance vision zone when the user is gazing at a substantially horizontal point in primary gaze. In another embodiment, the distance vision zone may have a center that is offset from the rotational axis of the contact lens. In a related embodiment, the distance vision zone may be in the shape of an oval.

The front surface also has an optical zone with a near vision zone, extending radially outward from the distance vision zone, having a second curvature range that provides near vision correction and having a second area that is sufficient to overlay a substantial portion of a pupil of a user. This near vision zone is preferably disposed in a second position within the optical zone so that the user's pupil is substantially subtended by the near vision zone when the user is gazing at a near vision point below the substantially horizontal point in down-gaze. In a related embodiment, the near vision zone may be substantially concentric with the rotational axis and may extend radially outward from the distance vision zone.

A ledge zone is preferably disposed below the optical zone and includes an undercut portion extending outwardly from the base surface to the front surface to enable engagement with a lower eyelid of a user to provide vertical translation support for the contact lens when being worn by the user. In one embodiment of the present invention, the height of the ledge may be between about 300-um and about 1200-um along the inferior vertical meridian. In a more preferred embodiment, the height of the ledge may be 700-um. In a related embodiment, the ledge may have an angular range from about 25 degrees to 70 degrees as measured from the vertical. In a preferred embodiment, the angle of the ledge is about 50 degrees from the vertical.

In one embodiment of the present invention, the lens may also have a transition zone that extends from the lower edge of the optical zone to the upper edge of the ledge zone and provides a smooth transition from the ledge zone to the optical zone. In a related embodiment the lens has a bevel zone that preferably extends radially outward and tapers to a narrow end. In still another embodiment, a lens of the present invention may have a thickness profile that increases along a vertical meridian. In a related embodiment, the lens may have a thickness profile that is substantially symmetric about the vertical meridian.

Lenses of the present invention may be made of a silicon hydrogel or HEMA. Lenses of the present invention are preferably capable of large amplitude translation. In one embodiment, the lens is capable of translating about 2 mm to about 5 mm. In a preferred embodiment, the lens is capable of translating about 3 mm to about 5 mm.

The present invention also includes a mold that is capable of creating the lens of the present invention. Additionally, the present invention includes a method of making a lens capable of large amplitude translation. This method includes cutting a first surface in lens material, the first surface including a base curve with an undercut designed to be engaged by a lower eyelid; supporting the undercut; transferring the cut lens material; and cutting a second front surface. In another embodiment, the supporting step may include adding blocking material behind the first cut surface. In still another embodiment, the second cut may remove material from the superior boundary of the lens to produce an oblong lens shape.

The present invention also includes a method of making a lens mold capable of creating a lens with large amplitude translation. This method includes cutting a first surface in lens mold material, the first surface including a male mold with an undercut; supporting the undercut feature of the mold; and; and cutting a second front surface, which is a female mold.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DESCRIPTION OF THE DRAWINGS

FIG. 1A is a front elevational view of one embodiment of the invention.

FIG. 1B is a cross-sectional view, exaggerated along the horizontal axis, of the embodiment shown in FIG. 1A, taken along line 1B-1B.

FIG. 1C is a detail portion of FIG. 1B.

DETAILED DESCRIPTION OF THE INVENTION

Figures 2A, 2B:
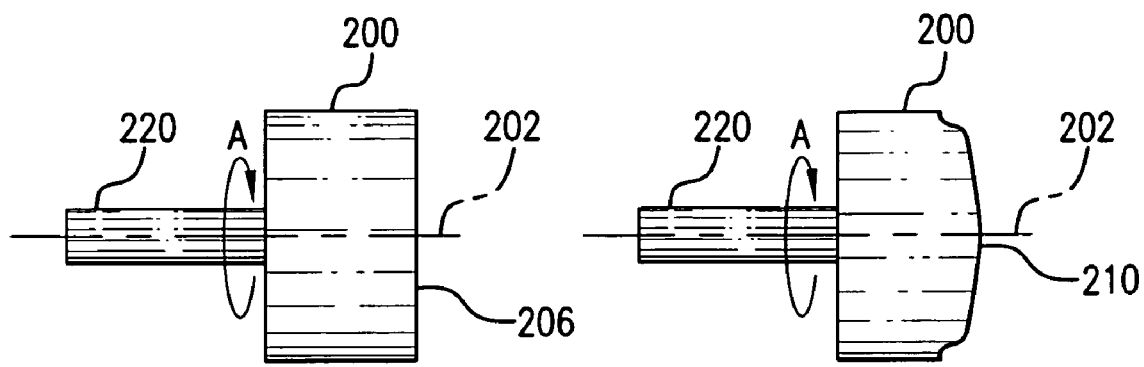
FIG. 2A is a side elevational view of an uncut button of lens material mounted on a spindle.
FIG. 2B is a side elevational view of the button of FIG. 2A after a first surface has been cut.

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A-1C, one embodiment of the invention is a contact lens 100 having top 108, a bottom 109, a rotational axis 102, an posterior surface 104 and an opposite anterior surface 106. The anterior surface 106 may include an optical zone 110, a transition zone 140, a ledge 150 and an undercut 158. The optical zone 110 has a lower edge 114 and includes a distance vision zone 120 and a near vision zone 130. The base (posterior) surface of the lens may have a circular boundary edge, from which, a ledge protrusion is extended from the inferior half of the lens. The base surface, less the ledge feature, may be rotationally symmetrical or may include a toric or biconic optical surface that is blended into a rotationally symmetrical base surface outer portion.

The distance vision zone 120 has a first curvature range that provides distance vision correction for the user. The area of the distance vision zone 120 is sufficient to overlay a substantial portion of a pupil 106a of a user (i.e. cover at least 50% of the pupil). The distance vision zone 120 is disposed so that the user's pupil is substantially subtended by the distance vision zone 120 when the user is gazing at a substantially horizontal point in primary gaze. Typically, the distance vision zone 120 will be offset from the rotational axis 102. This is so that the pupil 106 will be substantially subtended by the near vision zone 130 when the eye 107 is viewing in downgaze (e.g., when the eye 107 is engaged in reading). The distance a from the center 102 to the bottom of the distance vision zone 120 should be the minimum distance that allows the pupil 106a to be substantially subtended by the distance vision zone 120 when gazing at the horizon. This may result in the distance vision zone 120 having an oval shape. The distance zone 120 preferably provides vertical coma during downward gaze, when the lens translates inferiorly.

A blend zone preferably exists between the distance zone 120 and the near vision zone 130. This blend zone preferably includes surface inflection and a high relative curvature as compared to the curvature of the optical zone. Because optical power is proportional to curvature, light refracted by the blend zone is refracted away from the fovea.

A vertical meridian extends from the top of the lens 108 to the bottom of the lens 109. In the present invention, the optical zone is preferably located along the vertical meridian, which is preferably greater than about 9 mm in length. In a more preferred embodiment, the length of the optical zone is about 10.5 mm. As shown in FIG. 1B, the lens has a thickness profile. In a preferred embodiment, the thickness profile increases from the top of the lens 108 to the bottom of the lens 109, resulting in greater lens thickness towards the bottom of the lens. The lens also has a horizontal meridian that extends from the left side of the lens to the right side of the lens. In a preferred embodiment, the thickness profile along the horizontal meridian is substantially symmetric.

The near vision zone 130 may be substantially concentric with the rotational axis 102 and extends radially outward from the distance vision zone 120. The near vision zone 130 has a second curvature range that provides near vision correction for the user. The area of the near vision zone 130 is sufficient to overlay a substantial portion of the pupil 106b. The near vision zone 130 is disposed so that the user's pupil 106b is substantially subtended by the near vision zone 130 when the user is gazing at a near vision point below the substantially horizontal point in down-gaze (e.g., while reading). Both the distance vision zone 120 and near vision zone 130 may be placed either on the posterior surface 104 or the anterior surface 106 of the lens 100.

Referring to FIGS. 1A and 1B, the ledge 150 provides vertical translation support for the lens 100. Such support may allow the lens to translate in the range of about 2 mm to about 5 mm, preferably in the range of about 3 mm to 5 mm. The ledge 150 has a front portion 156 and an undercut lower edge 158. The ledge 150 is located below the optical zone 110. Undercut lower edge 158 extends between the front surface and base curve of the lens and is situated at an angle to front portion 156. Undercut lower edge 158 enables engagement with the user's lower eyelid 105. Thus, when the eye 107 moves in a downward direction, the ledge, specifically, undercut lower edge 158, engages the lower eyelid 105 and supports the lens 100, thereby allowing translation of the lens 100 across the surface of the eye 107.

The height of the ledge, measured as the thickness along the inferior vertical meridian at the edge, is preferably between about 300 um and about 1200 um. In a preferred embodiment, the height of the lens is about 700-um. The angle of the ledge from the vertical may range from about 25 to about 70 degrees. In preferred embodiment, the height of the ledge, to vertical, is about 50 degrees.

The transition zone 140 provides a smooth transition from the ledge 150 to the optical zone 110. The transition zone 140 extends from the lower edge 114 of the optical zone 110 to the upper edge of the ledge 156. This "surface blending," just above the ledge, may be concave (if the maximum thickness is at the edge) to flat, along the inferior vertical meridian.

The lens may also include other features normally associated with contact lenses. For example, the prism of the lens will typically be about 200 um from top to bottom For added comfort, the lens 100 may also include a bevel 170. Bevel 170 may be a variable reverse bevel on the base curve or fully tangent surface. The lens may also have an offset progressive to add intermediate vision in primary gaze. Virtually any optics may be used in conjunction with the present lens design. For example, one embodiment of the present invention may have an inferior offset progressive zone. Another embodiment may include optics that are created with a combined coma-like aberration and progressive profile. In still other embodiment, the lens design may include astigmatic correction on either the front surface or the base surface of the lens. In another embodiment, the lens may have greater than one diopters of negative spherical aberration, for a 6 mm pupil, on the distance zone.

The present lens design is designed such that the lens, tools, or molds can be fabricated via an ophthalmic lathe or its equivalent.

A lens 100 according to the invention typically would be made from a soft contact lens material, such as a silicon hydrogel or HEMA. Although, it will be understood that any lens described above comprising any soft contact lens material would fall within the scope of the invention.

A contact lens according to the invention could be constructed using a conventional contact lens molding process or can be cut on a lathe. In an embodiment using a molding process, the mold or the mold tools may be formed on a conventional computer-controlled cutter in conjunction with a lathe, of the type conventionally used in making master casts of contact lenses. Irrespective of whether the lens, the lens mold, or the mold tools are lathed, the lathing process may be similar as described herein for a lens. As such, the discussion below is exemplary only and should not be limited solely to the manufacture of a lens; rather, the following process may be used for a lens, a lens mold, or a mold tool.

As shown in FIG. 2A, a material 200 is mounted on a spindle 220 and is rotated around a rotational axis 202 in a pre-selected direction A. Specifically, the material may be in the shape of a button and clamped or otherwise attached to a pin. Initially, as shown in FIG. 2B, at least one first surface 210 is cut onto the outer surface 206 of the blank or button 200. The first surface 210 is preferably the posterior surface or base curve, which preferably includes the undercut feature of the lens of the present invention (ledge zone). During this process, a shoulder clamp is preferably used to block off the edges of the button. Additionally, wax, or another blocking material that does not scratch the surfaces of lenses, lens molds, or mold tools may be used to block the cut base curve during transfer. The blocking material may also provide support for the undercut feature. After the first surface is cut, the partially formed lens is transferred such that the second side, or anterior surface, may be cut. During the transfer the blocking material remains in place to prevent damage to the first cut surface. Additionally, keys or slots may be used to ensure that the lens remains in proper orientation relative to the spindle. This is particularly important in lenses that are aspherical. The front surface is cut in the same general manner as the back surface, except that the optical zone, the transition zone, and the bevel zone may be cut on the front surface. In an alternative embodiment, these zones may be cut on the back surface. The various vision surfaces may be cut in the lens, lens mold, or mold material by controlling the depth of the cutting instrument (as with a conventional computer control mechanism) as the material rotates.

During the second cut to the front surface, the diameter of the lens, lens mold and/or mold tools, may be cut to produce a pronounced undercut resulting in an oblong shape. Removing some of the diameter of the lens may provide better stability and increased translation. The boundary of the inferior half of the lens may vary with azimuthal angle such that the boundary is not circular and the edge does not lie in a plane. In a preferred embodiment, the boundary of the lens in the superior half is symmetrical and lies in the same plane. In another embodiment, the lens may have an edge round that varies as a sinusoid around, at least, the superior half of the lens. In an embodiment of the present invention in which a mold is created, the mold is preferably created such that lenses created by the mold may have an edge round that varies as a sinusoid around, at least, the superior half of the lens.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A contact lens having a top, a bottom, a rotational axis, a front surface and a base surface, the front surface including a plurality of zones, comprising:
    an optical zone having a lower edge, including:
        a distance vision zone having a curvature range that provides distance vision correction and having a first area that is sufficient to overlay a substantial portion of a pupil of a user and disposed in a first position within the optical zone so that the user's pupil is substantially subtended by the distance vision zone when the user is gazing at a substantially horizontal point in primary gaze;
        a near vision zone, extending radially outward from the distance vision zone, having a second curvature range that provides near vision correction and having a second area that is sufficient to overlay a substantial portion of a pupil of a user and disposed in a second position within the optical zone so that the user's pupil is substantially subtended by the near vision zone when the user is gazing at a near vision point below the substantially horizontal point in downgaze; and a ledge zone disposed below the optical zone, that includes an undercut portion extending outwardly from the base surface to the front surface to enable engagement with a lower eyelid of a user and thereby provide vertical translation support for the contact lens when being worn by the user.

2. The lens of claim 1, further comprising a transition zone extending from the lower edge of the optical zone to the upper edge of the ledge zone that provides a smooth transition from the ledge zone to the optical zone.

3. The lens of claim 1, further comprising a bevel zone, extending radially outward that tapers to a narrow end.

4. The contact lens of claim 1, wherein the distance vision zone has a center that is offset from the rotational axis of the contact lens.

5. The contact lens of claim 1, wherein the distance vision zone has an oval shape.

6. The contact lens of claim 1, wherein said lens has a thickness profile that increases along the vertical meridian.

7. The lens of claim 6, wherein said lens has a thickness profile that is symmetric about the vertical meridian.

8. The lens of claim 1, wherein the height of said ledge is between about 300-um and about 1200-um along the inferior vertical meridian.

9. The lens of claim 1, wherein the height of said ledge is about 700-um.

10. The lens of claim 1, wherein the ledge has an angular range between about 25 degrees and about 70 degrees measured from the vertical.

11. The lens of claim 1, wherein the angle of the ledge is about 50 degrees to the vertical.

12. The contact lens of claim 3, wherein the distance vision zone has an oval shape.

13. The contact lens of claim 1, wherein the near vision zone is substantially concentric with the rotational axis and extends radially outward from the distance vision zone.

14. The lens of claim 1, wherein said lens is capable of large amplitude translation in the range of about 2 mm to about 5 mm.

15. The lens of claim 1, wherein said lens is capable of large amplitude translation in the range of about 3 mm to about 5 mm.

16. The contact lens of claim 1, wherein the contact lens is comprised of soft contact lens material.

17. The contact lens of claim 16, wherein the soft contact lens material comprises a silicon hydro-gel.

18. The contact lens of claim 16, wherein the soft contact lens material comprises HEMA.

19. A mold capable of creating a lens wherein said created contact lens has a top, a bottom, a rotational axis, a front surface and a base curve, the front surface including a plurality of zones, comprising:

an optical zone having a lower edge, including:
   a distance vision zone having a curvature range that provides distance vision correction and having a first area that is sufficient to overlay a substantial portion of a pupil of a user and disposed in a first position within the optical zone so that the user's pupil is substantially subtended by the distance vision zone when the user is gazing at a substantially horizontal point in primary gaze;
   a near vision zone, extending radially outward from the distance vision zone having a second curvature range that provides near vision correction and having a second area that is sufficient to overlay a substantial portion of a pupil of a user and disposed in a second position within the optical zone so that the user's pupil is substantially subtended by the near vision zone when the user is gazing at a near vision point below the substantially horizontal point in downgaze; and
   a ledge zone disposed below the optical zone, that includes an undercut portion extending outwardly from the base curve to the front surface to enable engagement with a lower eyelid of a user and thereby provide vertical translation support for the contact lens when being worn by the user.

20. A method of making a lens capable of large amplitude translation comprising the steps of:
   cutting a first surface in lens material, wherein said first surface comprises a base curve, including an undercut, wherein said undercut is designed to be engaged by a lower eyelid;
   supporting said undercut;
   transferring said lens material; and
   cutting a second surface, wherein said second surface comprises a front surface; wherein the undercut extends outwardly from the base curve to the front surface.

21. The method of claim 20, wherein said supporting step further comprises adding blocking material behind the base curve and undercut.

22. The method of claim 20, wherein said second cut removes material from the superior boundary of the lens to produce an oblong lens shape.

23. A method of making a lens mold capable of creating a lens with large amplitude translation comprising the steps of: cutting a first surface in lens mold material, wherein said first surface comprises a male mold, including an undercut; supporting said undercut; transferring said lens mold material; and cutting a second surface, wherein said second surface comprises a female mold; wherein the undercut extends outwardly from the first surface to the second surface.

* * * * *